US010308732B2

(12) United States Patent
Matsui

(10) Patent No.: US 10,308,732 B2
(45) Date of Patent: Jun. 4, 2019

(54) PACKAGE FOR PELLETS OF SAPONIFIED ETHYLENE-VINYL ESTER-BASED COPOLYMER OR RESIN COMPOSITION THEREOF

(71) Applicant: THE NIPPON SYNTHETIC CHEMICAL INDUSTRY CO., LTD., Osaka (JP)

(72) Inventor: Ikko Matsui, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 174 days.

(21) Appl. No.: 15/324,080

(22) PCT Filed: Jul. 21, 2015

(86) PCT No.: PCT/JP2015/070720
§ 371 (c)(1),
(2) Date: Jan. 5, 2017

(87) PCT Pub. No.: WO2016/017478
PCT Pub. Date: Feb. 4, 2016

(65) Prior Publication Data
US 2017/0198066 A1 Jul. 13, 2017

(30) Foreign Application Priority Data
Jul. 29, 2014 (JP) .................................. 2014-153877

(51) Int. Cl.
*C08F 6/28* (2006.01)
*B65D 65/38* (2006.01)
(Continued)

(52) U.S. Cl.
CPC ................ *C08F 6/28* (2013.01); *B32B 5/022* (2013.01); *B32B 5/024* (2013.01); *B32B 5/26* (2013.01);
(Continued)

(58) Field of Classification Search
CPC ............................... C08J 3/12; C08J 2329/04
See application file for complete search history.

(56) References Cited

U.S. PATENT DOCUMENTS

| 5,146,822 A | 9/1992 | Noda et al. |
| 7,323,503 B2 | 1/2008 | Kawahara et al. |

(Continued)

FOREIGN PATENT DOCUMENTS

| JP | H11-11502 A | 4/1999 |
| JP | 2000-063528 A | 2/2000 |

(Continued)

OTHER PUBLICATIONS

International Search Report issued with respect to Application No. PCT/JP2015/070720, dated Oct. 20, 2015.
(Continued)

*Primary Examiner* — Mark S Kaucher
(74) *Attorney, Agent, or Firm* — Greenblum & Bernstein, P.L.C.

(57) ABSTRACT

The purpose of the invention is to provide: a package for EVOH resin pellets which is capable of providing the EVOH resin pellets almost free from powder even in a case where the package contains the powder generated therein during transportation or the like after shipment; and EVOH resin pellets contaminated with very small amount of the powder in a case where a user uses the EVOH resin pellets as a molding material. A package, where pellets each having a substantially circular or oval cross-section are packed in a packaging container whose inner surface has a surface
(Continued)

resistivity of $1.0 \times 10^{14} \Omega$ or more, is capable of providing pellets to which 0.8 wt % or less of powder adhered relative to the weight of the pellets.

10 Claims, 1 Drawing Sheet

(51) Int. Cl.
| | |
|---|---|
| B65D 85/00 | (2006.01) |
| C08J 3/12 | (2006.01) |
| B32B 27/32 | (2006.01) |
| B65D 65/40 | (2006.01) |
| B32B 5/02 | (2006.01) |
| B32B 5/26 | (2006.01) |
| B32B 15/082 | (2006.01) |
| B32B 15/085 | (2006.01) |
| B32B 15/088 | (2006.01) |
| B32B 15/09 | (2006.01) |
| B32B 15/18 | (2006.01) |
| B32B 15/20 | (2006.01) |
| B32B 27/06 | (2006.01) |
| B32B 27/08 | (2006.01) |
| B32B 27/10 | (2006.01) |
| B32B 27/12 | (2006.01) |
| B32B 27/30 | (2006.01) |
| B32B 27/34 | (2006.01) |
| B32B 27/36 | (2006.01) |
| B32B 29/00 | (2006.01) |

(52) U.S. Cl.
CPC .......... *B32B 15/082* (2013.01); *B32B 15/085* (2013.01); *B32B 15/088* (2013.01); *B32B 15/09* (2013.01); *B32B 15/18* (2013.01); *B32B 15/20* (2013.01); *B32B 27/06* (2013.01); *B32B 27/08* (2013.01); *B32B 27/10* (2013.01); *B32B 27/12* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 29/002* (2013.01); *B32B 29/005* (2013.01); *B65D 65/38* (2013.01); *B65D 65/40* (2013.01); *B65D 85/70* (2013.01); *C08J 3/12* (2013.01); *B32B 2250/02* (2013.01); *B32B 2250/03* (2013.01); *B32B 2250/04* (2013.01); *B32B 2250/05* (2013.01); *B32B 2255/02* (2013.01); *B32B 2255/10* (2013.01); *B32B 2255/12* (2013.01); *B32B 2255/205* (2013.01); *B32B 2255/26* (2013.01); *B32B 2307/20* (2013.01); *B32B 2307/202* (2013.01); *B32B 2307/206* (2013.01); *B32B 2307/31* (2013.01); *B32B 2307/7246* (2013.01); *B32B 2307/732* (2013.01); *B32B 2307/744* (2013.01); *B32B 2439/00* (2013.01); *B32B 2439/46* (2013.01); *B32B 2439/62* (2013.01); *B32B 2553/00* (2013.01); *B65D 2213/02* (2013.01); *C08J 2329/04* (2013.01)

(56) References Cited

U.S. PATENT DOCUMENTS

| | | | |
|---|---|---|---|
| 2004/0082690 A1* | 4/2004 | Kawahara | B29B 9/06 524/127 |
| 2006/0057318 A1 | 3/2006 | Tachino et al. | |
| 2013/0075299 A1 | 3/2013 | Ono et al. | |

FOREIGN PATENT DOCUMENTS

| | | |
|---|---|---|
| JP | 2002-067246 A | 3/2002 |
| JP | 2004-237473 A | 8/2004 |
| JP | 2004-160964 A | 10/2004 |
| JP | 2005-036115 A | 2/2005 |
| JP | 4197901 B2 | 12/2008 |

OTHER PUBLICATIONS

International Preliminary Report on Patentability issued with respect to Application No. PCT/JP2015/070720, dated Jan. 31, 2017.
Extended European Search Report from Application No. 15827605.5, dated Jan. 29, 2018.
Written Opinion issued with respect to Singapore Application No. 11201610874S, dated Oct. 27, 2017.

* cited by examiner

[Fig. 1]
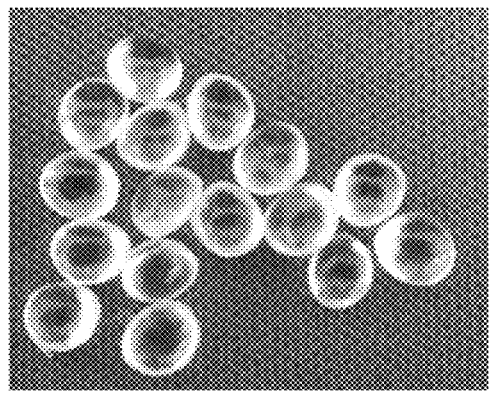
[Fig. 2]
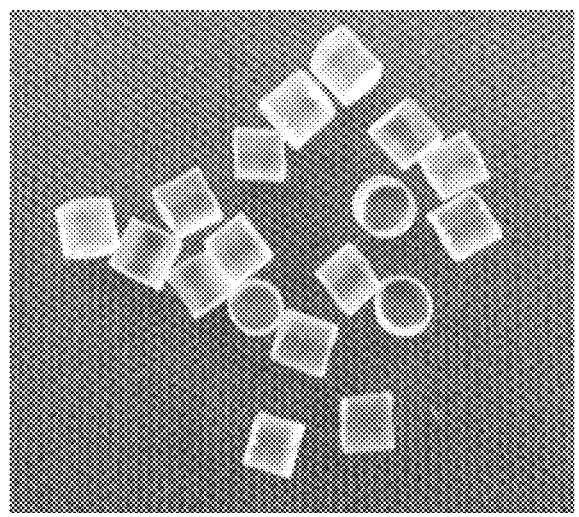

PACKAGE FOR PELLETS OF SAPONIFIED ETHYLENE-VINYL ESTER-BASED COPOLYMER OR RESIN COMPOSITION THEREOF

TECHNICAL FIELD

The present invention relates to a package for pellets of saponified ethylene-vinyl ester-based copolymer (hereinafter, referred to as "EVOH resin") or resin composition thereof.

BACKGROUND ART

EVOH resin has a high crystallinity based on hydrogen bonds between hydroxyl groups in side chain thereof, and additionally has a strong intermolecular force in amorphous portion thereof. These provide EVOH resin film with excellent gas-barrier property, For the purpose of utilizing the excellent gas-barrier property, EVOH resin is molded into film, sheet or a container such as bottle used for packaging food, pharmaceutical, industrial medicine, agricultural chemicals, and so on. A typical form of EVOH resin to be distributed as a molding material is in the form of pellet.

EVOH resin pellet is classified into a cylindrical pellet produced by strand pelletizing process disclosed in, for example, JP H3-61507A (patent document 1), and a spherical pellet produced by hot-cut pelletizing process such as underwater pelletizing and midair hot-cut pelletizing disclosed in JP2001-96530A (patent document 2).

EVOH resin pellet, in either shape of cylinder or sphere, is produced by cutting water-containing or molten EVOH resin strand at every given length, and rinsing the resulting cut pieces (i.e. pellets), followed by drying.

Drying pellets is performed with hot-air flow dryer system or the like, from the viewpoint of improvement of drying efficiency or preventing pellets fusion. In the case that pellets are forced to be flown, the pellets are rubbed each other, and therefore burr or edge of the pellet, which is generated in pelletizing process, is broken to convert into fine particles or powders.

For these reasons, EVOH resin pellets contaminated with the rubbishes or powder generated. in production of the pellets may be distributed and supplied as a molding material. Such contaminated EVOH resin pellets cause quality of a resulting molded article impaired. For example, JP2005-36115A (patent document 3) discloses problematic issues of prior art: feeding to an extruder is likely unstable, and when a multilayer film is produced by melt-extrusion, surface boundary between EVOH resin layer and its adjacent layer may become turbulent to generate gel or the like.

The patent document 3 suggests methods for providing EVOH resin pellets free from the powder. The methods include removing powder with sieve, classification with cyclone separator, cleaning up powder by rinsing with solvent and drying, or fusing powder by drying at relatively high temperature after water-spraying, thereby discreating the powder.

Various apparatuses for removing powder or rubbishes, such as sieve type separators, cyclone separators, and electrostatic removers are suggested.

PRIOR ART

Patent Document

[patent document 1]JP H3-61507A
[patent document 2]JP2001-96530A
[patent document 3]JP2005-36115A

SUMMARY OF THE INVENTION

Technical Problem to be Solved by the Invention

Establishment of facilities equipped with an apparatus for removing powder at the place of production of pellets is costly alternative and lowers productivity for the place of production.

EVOH resin pellets free from powder are shipped to send end-users in the form of a package such that the pellets are packed in a container.

Even if EVOH resin pellets free from powder are produced with facilities for removing powder, the EVOH resin pellets would be contaminated with powder generated in the process of packaging or transportation due to rubbing or collision of the EVOH resin pellets each other.

EVOH resin is hard but brittle. Therefore, if EN/OH resin pellets are rubbed or collide against each other in the container during transportation, powder would occur from the EVOH resin pellets. Moreover, since a common synthetic resin is likely to be charged with static electricity, the powder generated would attach to pellets easily.

For these reasons, even if EVOH resin pellets are produced and packed at the place where an apparatus for removing powder is set, the pellets taken out from the package by a user might be contaminated with powder.

The present invention has been made under these situations. The purpose of the invention is to provide a package for EVOH resin pellets which are capable of supplying EVOH resin pellets almost free from powder in a case where a user uses the EVOH resin pellets as a molding material, even in a case where the EVOH resin pellets are contaminated with powder generated after shipment and during transportation.

Means for Solving the Problems

A package of the invention comprises pellets made of saponified ethylene-vinyl ester-based copolymer or resin composition thereof, and a packaging container in which the pellets are packed, wherein the inside surface of the packaging container has a surface resistivity of $1.0 \times 10^{14} \Omega$ or more, and wherein each of the pellets has an approximately circular or oval cross-section.

Preferably, the inside surface of the packaging container has a surface resistivity of $1.0 \times 10^{18} \Omega$ or less.

A preferable packaging container is formed from a multilayer film, in particular, a multilayer film comprising an aluminum layer. A preferable rate in thickness of the aluminum layer to the multilayer film is in the range of 3.0 to 10%.

In a preferable embodiment, the package comprises powder in an amount of 0.0001 to 2.0 weight % based on the weight of the pellets of saponified ethylene-vinyl ester-based copolymer or resin composition thereof. Preferably the powder has a dimension passing through a 30 mesh sieve having an aperture of 500 μm.

In another aspect of the invention, pellets of saponified ethylene-vinyl ester-based copolymer or resin composition thereof, the pellets having been packed in the package of the invention, are included. The pellets are characterized by that the amount of the powder attached to surface of the pellets is 0.8 weight % or less based on the weight of the pellets.

The cross-section is any section made by a non-limiting plane cutting the pellet. Any cross-section of the pellet is approximate circular or oval, which means that the pellet has no edge.

The surface resistivity of inside surface corresponds to a surface resistance of a sheet when a current flows from one end to the opposite end on the sheet in a square area having a predetermined size. A poor electric current can flow on the sheet having higher surface resistivity.

Effect of the Invention

As for the inventive package for pellets of EVOH resin or resin composition thereof, the powder contained in the packaging container is easily to adhere to the inside surface of the container rather than of the surfaces of pellets of the package. Therefore, when a user takes out pellets from the package, the powder are left in the packaging container.

Accordingly, the package for pellets of the invention can provide pellets of EVOH resin or resin composition thereof free from powder even in a case where the powder generated in the package after packing process, for example during transportation.

This effect of the invention is particularly obtained in the case of using pellets each of which has an approximate circular or oval cross-section.

BRIEF DESCRIPTION OF THE DRAWINGS

FIG. 1 is a photograph of the appearance of EVOH resin pellets produced by hot-cut pelletizing process, each of the pellets having a spherical shape.

FIG. 2 is a photograph of the appearance of EVOH resin pellets produced by strand-cut pelletizing process, each of the pellets having a cylindrical shape.

MODE FOR CARRYING OUT OF THE INVENTION

The package of the invention is a package comprising pellets made of saponified ethylene-vinyl ester-based copolymer or resin composition thereof and a packaging container in which the pellets are packed. The container has inside surface having a surface resistivity of $1.0 \times 10^{14} \Omega$ or more. The pellets are a group of pellets each of which has an approximate circular or oval cross-section.

<Pellets of Saponified Ethylene-Vinyl Ester-Based Copolymer (EVOH Resin) or EVOH Resin Composition>

[EVOH Resin]

First, saponified ethylene-vinyl ester-based copolymer (EVOH resin) which is formed into pellets as the content of the package of the invention will be described.

EVOH resin is saponified ethylene-vinyl ester-based copolymer, which is produced by copolymerizing ethylene and vinyl ester-based monomer and saponifying the obtained copolymer. The EVOH resin is a water-insoluble thermoplastic resin.

Examples of the vinyl ester-based monomer include aliphatic vinyl esters such as vinyl acetate, vinyl formate, vinyl propionate, vinyl valerate, vinyl butyrate, vinyl isobutyrate, vinyl pivalate, vinyl caprate, vinyl laurate, vinyl stearate, and vinyl versatate; and aromatic vinyl esters such as vinyl benzoate. Of these, an aliphatic vinyl ester having carbon atoms of 3 to 20, further 4 to 10, particularly 4 to 7 is preferred. The vinyl ester monomer is usually used alone, or in a combination of two or more of them according to needs.

In general, vinyl acetate is preferably used because of its market availability and high efficiency of removing impurities in production.

A typical raw material of EVOH resin is one derived from petroleum such as naphtha, however, raw materials derived from natural gas such as shale gas, and raw materials derived from plants including purified derivatives such as sugar or starch obtained from sugar cane, sugar beet, corn, potato, and cellulose obtained from rice, wheat, millet, and other weed and plants may be used.

The EVOH resin has a content of ethylene unit of usually 20 to 60 mol %, preferably 25 to 50 mol %, particularly preferably 25 to 35 mol %, which is a measurement value according to ISO14663. The EVOH resin having an unduly low content of ethylene unit would be lowered in gas-barrier property under high humid condition and melt-molding property. The EVOH resin having an unduly high content of ethylene unit would be lowered in gas-barrier property.

The EVOH resin has a saponification degree of unit derived from vinyl ester monomer ranging from usually 90 to 100 mol %, preferably 95 to 100 mol %, particularly preferably 99 to 100 mol %, which is a measurement value according to JIS K6726 with the proviso that the measurement is conducted with the EVOH solution using water/methanol solvent for dissolving EVOH resin homogeneously. An EVOH resin having unduly low saponification degree would be lowered in gas-barrier property, thermal stability, and humidity resistance.

The melt flow rate (MFR) (210° C., load of 2, 160 g) of the EVOH resin is from usually 0.5 to 100 g/10 minutes, preferably 1 to 50 g/10 minutes, particularly preferably 3 to 35 g/10 minutes. The EVOH resin having an unduly high MFR would exhibit unstable film productivity. The EVOH resin having an unduly low MFR would have difficulty in melt-extruding due to its too high viscosity.

EVOH resin may further contain a structural unit derived from the following comonomer within the content of 10 mol % or less.

Examples of the comonomer include olefins such as propylene, 1-butene, and isobutene; hydroxy group-containing α-olefins such as 3-buten-1-ol, 3-butene-1,2-diol, 4-penten- 1-ol, and 5-hexene-1,2-diol; esterified products of hydroxy group-containing α-olefin such as 3,4-diacyloxy-1-butene such as 3,4-diacetoxy-1-buten; other derivatives of hydroxy group-containing α-olefin such as 2,3-diacetoxy-1-allyloxy propane, 2-acetoxy-1-allyloxy-3-hydroxy propane, 3-acetoxy-1-allyloxy-2-hydroxy propane, glycerin monovinyl ether, and glycerin monoisopropenyl ether; unsaturated acids such as acrylic acid, methacrylic acid, crotonic acid, phthalic acid (or phthalic anhydride), maleic acid (or maleic anhydride), and itaconic acid (or itaconic anhydride) or salt thereof, or its mono- or di-ester of alkyl having from 1 to 18 carbon atoms; acrylamides such as N-alkyl (having from 1 to 18 carbon atoms) acrylamide, N,N-dimethylacrylamide, 2-acrylanaide propanesulfonic acid or salt thereof, acrylamide propyl dimethylamine or its acid salt or its quaternary salt; methacrylamides such as methacrylamide, N-alkyl (having from 1 to 18 carbon atoms) methacrylamide, N,N-dimethylmethacrylamide, 2-methacrylamide propanesulfonic acid or its salt, methacrylamide propyl dimethylamine or its acid salt or its quaternary salt; N-vinylamides such as N-vinylpyrrolidone, N-vinylformamide, and N-vinylacetamide; vinyl cyanides such as acrylonitrile and methacrylonitrile; vinyl ethers such as alkyl (having from 1 to 18 carbon atoms) vinyl ether, hydroxy alkylvinyl ether, and alkoxyalkytvinyl ether; vinyl halide compounds such as vinyl chloride, vinylidene chloride, vinyl fluoride, vinylidene fluoride, and vinyl bromide; vinylsilanes such as trimethoxyvinylsilane, allyl acetate, allyl halide compounds such as allyl chloride; allyl alcohols such as allyl alcohol and dimethoxy allyl alcohol; trimethyl-(3-acrylamide-3-dimethylpropyl)-ammonium chloride, acrylamide-2-methylpropanesulfonic acid, and the like comonomers.

In addition, EVOH resin with post-modification such as urethanation, acetalization, cyanoethylation, or oxyalkylenation may be used.

In particular, EVOH resin modified with hydroxy group-containing α-olefin is preferred because of improved secondary formability. A preferable modified EVOH resin is an EVOH resin having primary hydroxyl group in side chain thereof, particularly EVOH resin having 1,2-diol structural unit in side chain thereof.

A modified EVOH resin whose side chain is modified with 1,2-diol structural unit is EVOH resin containing 1,2-diol structural unit in its side chain which is specified by the general formula (1) below.

[formula 1]

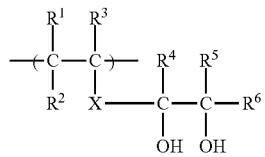

(1)

In the formula (I), $R^1$, $R^2$, and $R^3$ each is independently a hydrogen atom or an organic group, X is single bond or a binding chain, and $R^4$, $R^5$, and $R^6$ each is independently a hydrogen atom or an organic group.

Examples of the organic group in the 1,2-diol structural unit represented by the formula (1) include saturated hydrocarbon group such as methyl, ethyl, n-propyl, isopropyl, n-butyl, isobutyl, and tert-butyl; and aromatic hydrocarbon group such as phenyl and benzyl; halogen atom, hydroxyl group, acyloxy group, alkoxycarbonyl group, carboxyl group, sulfonic acid group and so on.

As for each of $R^1$ through $R^3$, hydrogen or a saturated hydrocarbon group having usually 1 to 30, particularly 1 to 15, more particularly 1 to 4 carbon atoms is preferable, and hydrogen atom is most preferable. As for each of $R^4$ through $R^6$, hydrogen atom or an alkyl group having from usually 1 to 30, particular 1 to 15, more particular 1 to 4 carbon atoms is preferab$R^2$, and hydrogen atom is most preferable. In particular, it is most preferable that $R^1$ through $R^6$ all are hydrogens.

X in a structural unit represented by the formula (1) is typically single bond.

X may be a binding chain as long as the effect of the invention is not inhibited. Examples of the binding chain include hydrocarbon chain such as alkylene, alkenylene, alkynylene, phenylene, and naphthylene (which may have substituent such as halogen such as fluorine, chlorine, bromine and so on); ether bond-containing group such as —O—, —(CH$_2$O)m—, —(OCH$_2$)m—, and —(CH$_2$O)mCH$_2$—; carbonyl-containing group such as —CO—, —COCO—, —CO(CH$_2$)mCO—, and —CO(C$_6$H$_4$)CO—; sulfur atom-containing group such as —S—, —CS—, —SO—, and —SO$_2$—; nitrogen-containing group such as —NR—, —CONR—, —NRCO—, —CSNR—, —NRCS—, and —NRNR—; hetero atom (e.g. phosphorus)-containing group such as —HPO$_4$—; silicon-containing group such as —Si(OR)$_2$—, —OSi(OR)$_2$—, and —OSi(OR)$_2$O—; titanium-containing group such as —Ti(OR)$_2$—, —OTi(OR)$_2$—, and —OTi(OR)$_{20}$—; aluminum-containing group such as —Al(OR)—, —OAl(OR)—, and —OAl(OR)O—. In these group, R is independently a substituent, preferably hydrogen atom or an alkyl group, and m is natural number selected from usually 1 to 30, preferably 1 to 15, more preferably 1 to 10. In particular, from the viewpoint of stability in production and use, —CH$_2$OCH$_2$— and hydrocarbon chain having from 1 to 10 carbon atoms are preferred, and hydrocarbon chain having from 1 to 6 carbon atoms, particularly 1 carbon atom is more preferred.

A most preferable 1,2-dial structural unit represented by the formula (1) is a structural unit in which all of $R^1$ through $R^6$ are hydrogen atoms and X is single bond, that is a structural unit represented by the formula (1a) shown below.

[formula 1a]

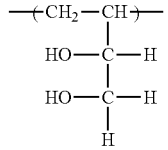

(1a)

In the case that EVOH resin contains the 1,2-dial structural unit represented by the formula (1), the content of the 1,2-diol structural unit is in the range of usually 0.1 to 20 mol %, preferably 0.1 to 15 mol %, more preferably 0.1 to 10 mol %.

According to the invention, a mixture of EVOH resins different from each other may be used. EVOH resins different in content of ethylene unit, 1,2-diol content of structural unit of the formula (1), saponification degree, melt flow rate (MFR), unit of another copolymer, and so on may be combined.

EVOH resins having above-mentioned structure may be produced by a conventionally known method.

Polymerization of vinyl ester-based monomer may be performed by, for example, solution polymerization, suspension polymerization, emulsion polymerization, or bulk polymerization. A solution polymerization using methanol as a solvent is commonly employed. Continuous or batch polymerization may be employed.

Copolymerization of ethylene may be performed by a conventional ethylene pressurized polymerization. The content of ethylene unit is controllable by ethylene pressure. The ethylene pressure is usually selected from the range of 25 to 80 kg/cm$^2$ depending on an intended ethylene content.

Saponification of the obtained ethylene-vinyl ester-based copolymer may be performed by any known method. The ethylene-vinyl ester-based copolymer is saponificated with alkali catalyst or acid catalyst in the condition that the copolymer is dissolved in alcohol or water-containing alcohol.

EVOH resin thus produced comprises ethylene unit and vinyl alcohol structural unit both for main units, and a slight amount of vinyl ester structural unit as a still remaining unsaponified unit.

The common conditions in copolymerization for synthesizing EVOH resin are as follows.

Common solvents used for copolymerization are lower alcohols such as methanol, ethanol, propanol, and butanol, ketones such as acetone, and methylethyl ketone, and so on. Of these, methanol is preferably used in industry.

The amount of the solvent to be used is appropriately selected depending on the intended polymerization degree of the copolymer with taking account of chain transfer constant of the solvent. For example, in the case of using methanol as the solvent, the amount is selected from the range of 0.01 to 10, preferably 0.05 to 7 as a weight ratio of solvent/monomer (S/M).

Examples of polymerization catalysts used for copolymerization include known radical polymerization catalysts such as azobisisobutyronitrile, acetyl peroxide, benzoyl peroxide, and lauryl peroxide, and low temperature active radical polymerization catalysts such as peroxyesters, peroxydicarbonates, and diacylperoxide. Amount of the polymerization catalyst to be used varies depending on the type of catalyst, and is appropriately selected based on polymerization rate.

A hydroxlactone-based compound or hydroxycarboxylic acid may be preferably used together with the polymerization catalyst because their copresence can reduce coloration of the pellets.

In the case of using hydroxyl lactone-based compound or hydroxyl carboxylic acid either in batch process or continuous process, the amount is selected from the range of 0.0001 to 0.1 parts by weight, preferably 0.0005 to 0.05 parts by weight, more preferably 0.001 to 0,03 parts by weight, based on 100 parts of vinyl ester-based monomer. The amount is unduly low, the copresence effect would not be obtained sufficiently. To the contrary, the amount is unduly high, polymerization of vinyl ester-based monomer would be inhibited. In the case that such compound are added into the polymerization reaction system, the addition is usually conducted after diluting the compound with a solvent such as water, lower aliphatic alcohol (e.g. methanol, ethanol, propanol, tert-butanol), aliphatic ester including vinyl ester-based monomer (e.g. acetic acid, methyl acetate, ethyl acetate), or mixture thereof, but not limited thereto.

Copolymerization reaction is commonly conducted at a temperature lower than boiling point of the solvent, usually selected from the range of 40 to 80° C., more preferably 55 to 80° C., depending on the solvent to be used or pressure, but not limited thereto. Unduly low copolymerization temperature extends the polymerization time. Shortening polymerization time would need a larger amount of catalyst. Unduly high copolymerization temperature tends to become polymerization control difficult.

The polymerization time is selected from the range of 4 to 10 hours, preferably 6 to 9 hours in the case of batch process. If the polymerization time is unduly short, elevated polymerization temperature or increased amount of catalyst is needed. On the other hand, unduly long polymerization time is unpreferred in productivity. In the case of continuous process, average residence time in polymerization reactor is from 2 to 8 hours, preferably 2 to 6 hours. An unduly short residence time requires a higher polymerization temperature or a larger amount of catalyst. An unduly long polymerization time is unpreferred in productivity.

Polymerization rate of vinyl ester-based monomer is set as high as possible within the range controllable in polymerization, preferably within 20 to 90%, from the viewpoint of productivity. Unduly low polymerization rate raises a problem associated with low productivity or increased unpolymerized vinyl acetate monomer. To the contrary, unduly high polymerization rate makes polymerization control difficult.

If coplymerization proceeds for a given time up to the intended rate of polymerization, a polymerization inhibitor is optionally added, and subsequently unreacted ethylene gas is evaporated and removed, followed by removing unreacted vinyl ester.

Unreacted vinyl ester is removed from the ethylene-vinyl ester copolymerization system in which ethylene has already removed by, for example, a method that the ethylene-vinyl ester copolymer solution is continuously fed at a constant rate from an upper portion of a tower equipped with Raschig rings while gaseous organic solvent such as methanol is blown into the tower from bottom thereof, and thereby allowing the mixture of the gaseous organic solvent and unreacted vinyl ester to flow out of the top of the tower. A final copolymer solution substantially free from unreacted vinyl ester can be taken out from the bottom of the tower.

To the copolymer solution in which unreacted vinyl ester is removed alkali catalyst is added, and vinyl ester units in the copolymer are saponified.

The saponification is performed in the presence of alkali or acid catalyst in the state of solution of the vinyl ester copolymer dissolving in alcohol or water-containing alcohol. Examples of the alcohol include lower alcohol having 1 to 4 carbon atoms such as methanol, ethanol, propanol, and tert-butanol, and among them, methanol is preferred. The content of the vinyl ester copolymer in the alcohol is appropriately selected usually from the range of 10 to 60 wt % depending on viscosity of the solution. As the catalyst for the saponification, alkali catalyst or acid catalyst may be used. Examples of the alkali catalyst which is hydroxide or alcoholate of alkali metal include sodium hydroxide, potassium hydroxide, sodium methylate, sodium ethylate, potassium methylate, and lithium methylate, and examples of the acid catalyst include sultbric acid, hydrochloric acid, nitric acid, methanesulfonic acid, zeolite, and cation exchange resin.

The amount of the catalyst used for saponification is appropriately selected depending on saponification process, intended saponification degree and so on. in the case of using alkali catalyst, the amount ranges usually from 0.001 to 0.1 equivalent, preferably from 0.005 to 0.05 equivalent, based on the total amount of monomers including vinyl ester-based monomer and so on. Any saponification method such as batch saponification, continuous saponification on belt, and continuous saponification in tower may be employed according to an intended saponification degree. Saponification under a fixed pressure in tower is preferably conducted because the method can reduce the amount of alkali catalyst and can improve the efficiency of the saponification reaction.

An appropriate pressure in saponification depends on an intended ethylene unit content of EVOH resin, and is selected from the range of 2 to 7 kg/cm$^2$. The saponification temperature is selected from the range of 80 to 150° C., preferably 100 to 130° C. The saponification time is selected from the range of 0.5 to 3 hours. After the saponification, the obtained EVOH resin is neutralized, if necessary.

[EVOH Resin Composition]

The pellets used in the present invention are not limited to pellets made of EVOH resin alone. Pellets made of EVOH resin composition containing an additive or other thermoplastic resin described below may be used.

(1) Other Thermoplastic Resin

Other thermoplastic resin may be contained in the EVOH resin composition but the amount is usually at most 30% by weight based on EVOH resin.

Examples of the other thermoplastic resin include olefin homo- or copolymer such as linear low density polyethylene, low density polyethylene, medium density polyethylene, high density polyethylene, ethylene-vinyl acetate copolymer, ionomer, ethylene-propylene copolymer, ethylene-α-olfefin (having 4 to 20 carbon atoms) copolymer, ethylene-acrylic acid ester copolymer, polypropylene, propylene-α-olefin (having 4 to 20 carbon atoms) copolymer, polybutene, and polypentene; polycyclic olefin; graft modified polymer obtained by modifying these olefin homo-or copolymer with unsaturated carboxylic acid or its ester; or a like polyolefin-based resin in a broad sense of the term; polystyrene-based resin, polyester, polyamide, copolyamides, polyvinyl chloride, polyvinylidene chloride acryl-based resin, vinyl ester-based resin, polyester elastomer, polyurethane elastomer, chlorinated polyethylene, chlorinated polypropylene, and a like thermoplastic resin.

A typical raw material of the thermoplastic resin is a material derived from petroleum such as naphtha, however, raw materials derived from natural gas such as shale gas, and raw materials derived from plants including purified derivatives such as sugar or starch obtained from sugar cane, sugar beet, corn, and potato, and cellulose obtained from rice, wheat, millet, and other weed and plants may be used.

For the other thermoplastic resin, polyamide-based resin is preferably used. In the case that pellets of EVOH resin composition containing polyamide-based resin is formed into a gas-barrier layer of a multilayer structure as a wrapping material for food, the polyamide-based resin can prevent elution of the EVOH resin composition layer from edges of the wrapping material when the wrapped food is subjected to hydrothermal treatment.

A conventionally known polyamide-based resin may be used.

Examples of homopolymer type polyamide-based resin include polycapramide (nylon 6), poly-ω-amino heptanoic acid (nylon 7), poly-ω-aminononanoic acid (nylon 9), poly-undecanamide (nylon 11), and polylauryl lactam (nylon 12). Examples of copolymer type polyamide-based resin include aliphatic polyamide such as polyethylenediamine adipamide (nylon 26), poly(tetramethylene adipamide) (nylon 46), poly(hexamethylene adipamide) (nylon 66), poly(hexamethylene sebacamide) (nylon 610), poly(hexamethylene dodec-amide) (nylon 612), poly(octamethylene adipamide de) (nylon 86), poly(decamethylene adipamide) (nylon 108), caprolactam/lauryl lactam copolymer (nylon 6/12), caprolactam/ω-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide/hexamethylene diammonium adipate copolymer (nylon 26/66), caprolactam/hexamethylene diammonium adipate/hexamethylene diammonium sebacate copolymer (nylon 66/610), ethylene diammonium adipate/hexamethylene diammonium adipate/hexamethylene diammonium sebacate copolymer (nylon 6/66/610); aromatic polyamide such as poly(hexamethylene isophthalamide), poly(hexamethylene terephthalamide), poly(metaxytylene adipamide), hexamethylene isophthalamide/terephthalamide copolymer, poly(p-phenylene terephthalamide), poly(p-phenylene)-3,4'-diphenyl ether terephthalamide; amorphous polyamide; modified polyamide obtained by modifying these polyamide-based resin with aromatic amine such as methylenebenzylamine or metaxylene diamine; metaxylylene diammonium adipate and so on. Terminal-modified polyamide-based resin of the above-mentioned polyamide may be also included. Such terminal-modified polyamide-based resin is preferably used.

Specific examples of the terminal-modified polyamide-based resin include a terminal-modified polyamide-based resin modified with hydrocarbon group having from 1 to 22 carbon atoms, which may be produced by a method disclosed in for example, JP H5-19302B. Also, a commercially available terminal-modified polyamide-based resin may be used.

Terminal modifier used for terminal-modified polyamide-based resin is an amine capable of reacting with carboxyl group because the amine can reduce the content of carboxyl groups in the polyamide-based resin. The amine $HNR^1R^2$ includes monosubstituted amine in the case of hydrogen atom for $R^2$ and disubstituted amine. The organic group for $R^1$ and/or $R^2$ of $HNR^1R^2$ may be any hydrocarbon group without carboxyl group, and may have a functional group other than carboxyl group, for example, hydroxyl group, amino group, and carbonyl group, as long as the functional group adversely affects the present invention. A preferable organic group is an aliphatic hydrocarbon group.

The less content of unmodified carboxyl group at the terminal of the terminal-modified polyamide-based resin is preferable. The content per polymer 1 g is in the range of usually 0 to 50 μeq, preferably 0 to 30 μeq, particularly preferably 0 to 25 μeq, as the value (molar equivalent per polymer 1 g) calculated by titrating a solution of polyamide resin dissolved in benzyl alcohol using 0.1N sodium hydroxide aqueous solution. If this value is unduly large, gel or the like generates in forming into film, and the resulting film tends to have inferior appearance as well as lowered retorting property. If this value is unduly small, the productivity of the terminal-modified polyamide-based resin is likely to be lowered, however, the physical property of the resulting terminal-modified polyamide-based resin does not remarkably impaired. Therefore, unmodified carboxyl group may be allowed to remain to some extent, ranging from usually 5 to 50 μeq, preferably 10 to 30 μeq, more preferably 15 to 25 μeq as its content per polymer 1 g.

Even in the case of polyamide-based resins other than the above-mentioned terminal modified polyamide-based resin, the terminal $NH_2$ group as well as terminal carboxyl group is preferably modified with hydrocarbon group having from 1 to 22 carbon atoms.

(2) Inorganic Filler

EVOH resin composition to be used as raw material for pellets may further contain an inorganic filler, which may improve gas-barrier property of the resulting molded product.

As the inorganic filler, planer inorganic filler is preferred because of exerting the expected gas-barrier property. Examples of the plate-like inorganic filler include kaolin, mica, smectite, talc, and so on. Kaolin is plate-like particle of hydrous aluminum silicate as a main component. Mica and smectite are layered silicic acid mineral. Talc consists of magnesium hydroxide and silicate. A preferable plate-like inorganic filler is kaolin. Types of kaolin and calcination are not limited, but calcined kaolin is preferred.

The amount of the plate-like inorganic filler to be added is selected from the range of usually 1 to 20 wt %, preferably 3 to 20 wt %, more preferably 5 to 15 wt %, based on the weight of EVOH resin.

(3) Oxygen Scavenger

The EVOH resin composition to be used for pellets may further contain oxygen scavenger, which can impart gas-barrier performance to a molded article therefrom, in particular, can improve gas-barrier property of multilayer structure used for wrapping material for food after a hot water treatment (e.g. retorting treatment)

The oxygen scavenger is a compound or composite which traps oxygen faster than the wrapped substance. Specific oxygen scavenger includes inorganic oxygen scavenger such as metal and metallic compound; organic oxygen scavenger such as hydroxyl group-containing compound, quinone-based compound, double bond-containing compound, and oxidable resin; and composite type oxygen scavenger which is an assembly of inorganic catalyst and organic compound.

Composite type oxygen scavenger is a combination of transition metal catalyst and organic compound. The transition metal catalyst excites oxygen and allows the organic compound to react with oxygen, thereby eliminating oxygen. The organic compound in the composite type oxygen scavenger can react with oxygen faster than wrapped substances such as food, thereby eliminating oxygen. Transition metal constituting the transition metal-based catalyst is at least one selected from the group consisting of titanium, vanadium, chromium, manganese, iron, cobalt, nickel, copper, zinc, zirconium, ruthenium, and palladium. Particularly, cobalt is preferred in the point of compatibility with resin, catalyst function, and safety. Preferable organic compound includes ring-opened polymer of cycloalkenes such as polyoctenylene, polymer of conjugated diene such as butadiene, and cyclized product thereof. Preferable other organic compound includes nitrogen-containing resin such as MXI) nylon, tertiary hydrogen-containing resin such as polypropylene, polyalkylene ether bond-containing resin such as block copolymer having polyalkylene ether unit, anthraquinone polymer.

The amount of the oxygen scavenger to be added is not particularly limited, but is in the range of usually 1 to 30 wt %, preferably 3 to 25 wt %, more preferably 5 to 20 wt %, based on the weight of EVOH resin.

(4) Other Additives

Besides the aforementioned ingredients, the EVOH resin composition of the invention may optionally contain known additives as follows: plasticizer such as ethylene glycol, glycerin, hexanediol, or the like aliphatic polyalcohol; lubricant such as saturated aliphatic amide (e.g. stearamide), unsaturated fatty acid amide (e.g. amide oleate), his-fatty acid amide (e.g. ethylene his stearamide), and low molecular weight polyolefin (e.g. low molecular weight polyethylene or low molecular weight polypropylene having a molecular weight of 500 to 10000); thermal stabilizer; antiblocking agent; antioxidant; colorant; antistatic agent; ultraviolet absorber; insecticide; insoluble inorganic salt (e.g. hydrotalcite); filler (e.g. inorganic filler); nucleating agent (e.g. talc and caoline); surfactant or wax; dispersant (e.g. calcium stearate and monoglyceride stearate); conjugated polyene compound, and aldehyde compound (e.g. unsaturated aldehydes such as crotonaldehyde). In the case of containing such additives, the content is within not impairing the effect of the invention, for example, less than 5 wt % based on the total weight of the resin composition.

The thermal stabilizer may be contained for the purpose of improving physical properties such as thermal stability in melt-molding. Examples of the thermal stabilizer include organic acids such as acetic acid, propionic acid, butyric acid, lauric acid, stearic acid, oleic acid, and behenic acid, or its alkaline metal (e.g. sodium and potassium) salt, its alkaline earth metal salt (e.g calcium and magnesium), or zinc salt; inorganic acids such as sulfuric acid, sulfurous acid, carbonic acid, phosphoric acid, and boric acid, or its alkaline metal (e.g. sodium and potassium) salt, its alkaline earth metal (e.g. calcium and magnesium) salt, or zinc salt. Of these, acetic acid, boron compound such as boric acid and its salt thereof, acetate, and phosphate are particularly preferred.

In the case of adding acetic acid, the amount of the acetic acid based on 100 parts by weight of EVOH resin is in the range of usually 0.001 to 1 parts by weight, preferably 0.005 to 0.2 parts by weight, particularly preferably 0.010 to 0.1 parts by weight. If the amount is unduly low, sufficient effect of acetic acid would not be obtained. To the contrary, if the amount is unduly high, the production of film with uniform property would be difficult.

In the case of adding boron compound, the amount of the boron compound based on 100 parts by weight of EVOH resin is in the range of usually 0.001 to 1 parts by weigh, preferably 0.002 to 0.2 parts by weight, particularly preferably 0.005 to 0.1 parts by weight, in terms of weight of boron. The weight of boron is determined by ICP emission analysis after incineration of the boron compound. If the amount is unduly low, sufficient effect of boron compound would not be obtained. To the contrary, if the amount is unduly high, the production of film with uniform properties would be difficult.

The amount of metal salt of acetic acid, phosphoric acid or hydrogenphosphoric acid is usually from 0.0005 to 0.1 part by weight, preferably from 0.001 to 0.05 part by weight, particularly preferably from 0.002 to 0.03 part by weight, in terms of weight of metal based on 100 parts by weight of EVOH resin. The weight of metal is determined by ICP emission analysis after incineration of the metal salt. If the amount is unduly low, sufficient effect of the metal salt would not be obtained. To the contrary, if the amount is unduly high, the production of film with uniform properties would be difficult. In the case of adding two or more of salts to EVOH resin (A), the total amount is desired to fall in the above range.

The conjugated polyene compound is a compound containing conjugated double bond which is a structure alternating carbon-carbon double bond and carbon-carbon single bond and has two or more carbon-carbon double bonds. The conjugated polyene includes conjugated diene consisting of one single and two double carbon-carbon bonds; conjugated triene consisting of two single and three double carbon-carbon bonds; and conjugated polyene consisting of more than two single and more than three double carbon-carbon bonds. Examples of the conjugated polyene compound. include conjugated diene compound having two carbon-carbon double bonds such as isoprene, myrcene, farnesene, cembrene, sorbic acid sorbic acid ester, sorbate, and abietic acid; conjugated triene compound having three double bonds such as 1,3,5-hexatriene, 2,4,6-octatriene-1-carboxylic acid, eleostearic acid, tong oil, and cholecalciferol; conjugated polyene compound having 4 or more double bonds such as cyclooctatetraene, 2,4,6,8-decatetraene-1-carboxylic acid, retinol, and retinoic acid. These conjugated polyene compounds may be used alone or in a combination of two types or more of them.

The amount of the conjugated polyene to be added is selected from the range of usually 0.000001 to 1 part by weigh, preferably 0.00001 to 1 part by weight, particularly preferably 0.0001 to 0.01 part by weight, based on 100 parts by weight of EVOH resin.

The conjugated polyene compound may be preferably contained in EVOH resin in advance.

[Preparation of EVOH Resin Composition]

EVOH resin composition is prepared usually by melt-kneading or mechanically mixing (e.g. dry blending), preferably by melt-kneading.

A conventionally known melt-kneader may be used for melt-kneading. Non-limiting examples include kneader-ruder, mixing roll, banbury mixer, plastomill, and extruder. As for the extruder, single or twin screw extruder may be used, and if necessary, vent suction apparatus, gear pump apparatus, screen apparatus or the like may be appropriately equipped with the extruder. The temperature in melt-kneading is selected from the range of usually 150 to 300° C., preferably 170 to 250° C.

[Pellets Made of EVOH Resin or Resin Composition Thereof]

(1) Shape of Pellet Made of EVOH Resin or Resin Composition Thereof

Each of pellets of EVOH resin or resin composition thereof has approximately circular or oval cross-section. Any cross-section of the pellet is approximate circle or oval in shape, in other words, the pellet has no edge. Such pellet is usually produced by hot-cut pelletizing described later.

A photograph of the pellets produced by hot-cut pelletizing is shown irr FIG. 1. For comparison, the photograph of the pellets produced by strand-cut pelletizing is shown in FIG. 2. The pellets shown in FIG. 2 each had a cylindrical shape, and therefore when the pellet is inclined at some angle, edge of the pellet is depicted. While any pellet in FIG. 1 appears approximately circle or oval without edge when viewing pellets from any direction. Accordginly, we understand that the pellets shown in FIG. 1 have spherical, lenticular or disc shaped individually.

The pellet to be used in the invention has a coss-sectional shape satisfying a ratio (min) of major axis (m) to minor axis (n) in the range of usually 1 to 2, preferably 1 to 1.8, particularly preferably 1 to 1.5. If each of the pellets applied to melt extrusion has unduly large ratio (m/n), feeding performance would be lowered.

The ratio of major axis (m) to minor axis (n) is 1, i.e. m/n=1, means that the shape of pellet is perfect sphere which has circular cross-section.

The pellet has a maximum major axis (m) ranging from usually 3 to 6 mm, preferably 3.5 to 5.5 mm, particularly preferably 4.3 to 5.2 mm, and maximum minor axis (n) ranging from usually 2.5 to 6 mm, preferably 3 to 5.5 mm, particularly preferably 3.5 to 5.2 mm, in its cross-section. If the major axis of the pellet has unduly large or small, as well as the minor axis has unduly large or small, a group of the pellets would exhibit lowered feeding performance when used for a material for being applied to melt extrusion.

(2) Manufacturing Method for Pellets

A method for manufacturing pellets will be described in detail below.

EVOH resin as a raw material for pellets may be fed to melt extruder in the state as follows: (i) a solution or slurry of EVOH resin as it is after saponification in production of EVOH resin, or water-containing EVOH resin composition obtained by properly adjusting water content of the solution or slurry of PAM resin; alternatively (ii) molten EVOH resin obtained by melting dry EVOH resin pellets produced by strand pelletization.

(2-1) Case of Using Water-Containing EVOH Resin Composition as a Raw Material

In the case of water-containing EVOH resin composition, a preferable water-containing EVOH resin composition fed to extruder as a raw material for pellets contains 0 to 10 parts by weight of alcohol and 10 to 500 parts by weight of water, both based on 100 parts by weight of EVOH resin.

If water-containingIf EVOH resin composition having a relatively high alcohol content is used, it is difficult to keep a safe environment of workplace or its surrounding area because of volatilization of alcohol in post-process. If pellets are cleansed with water having a relatively high temperature so as to remove the alcohol, the pellets are liable to cohere each other. On the other hand, if pellets are cleansed with cold water, the cleansing time is extended and results in lowering efficiency of the production of pellets.

In the case that water-containing EVOH resin composition having a relatively high water content is applied to melt cutting process, molten EVOH resin pieces immediately after being cut are liable to cohere each other, and pellets produced would differ in their shape. To the contrary, water-containing EVOH resin composition having a relatively low water content exhibits insufficient flowability, resulting in lowering productivity of pellets.

A method of adjusting water content of water-containing EVOH resin composition for pellets is not limited, in order to increase the water content, spraying water to resin, immersing resin in water, bringing resin into contact with vaporized water or the like can be employed. In order to decrease the water content, drying is appropriately performed. Drying can be performed with a hot air fluidized bed dryer or hot air ventilation dryer. The hot air fluidized bed dryer is preferably adopted from the viewpoint of reducing dried spots. In addition, drying temperature is preferably set at 120° C. or less from the viewpoint of reducing thermal deterioration.

EVOH resin solution obtained by saponification usually contains a large amount of alcohol, however, the alcohol content can be reduced by bringing the EVOH resin solution into contact with vaporized water, Water-containing EVOH resin composition having thus reduced alcohol content can be led out of the reaction system to serve a raw material for manufacturing pellets.

In the case of feeding water-containing EVOH resin composition to an extruder as a raw material for pellets, the temperature of the water-containing EVOH resin composition in the extruder is set within the range of preferably 70 to 170° C., more preferably 80° C. or more, further preferably 90 DC or more but 170° C. or less. If the temperature of the water-containing EVOH resin composition is less than 70° C., the EVOH resin would not be completely molten. If the temperature of the water-containing EVOH resin composition exceeds 170° C., the EVOH resin would be deteriorated due to heat. The temperature of resin composition in the specification is a temperature measured nearby discharging exit of extruder head with a temperature sensor placed on the extruder cylinder.

The type of extruder is not limited, but the exit of the nozzle has a diameter of usually 1 to 10 mm, preferably 2 to 5 mm, from the viewpoint of handleability of pellets.

The number of blades of cutter is usually from 2 to 8, preferably from 3 to 6.

The blades is preferably set in a manner that the blades contact the die exit of the extruder, that is to say, the die-cutter distance may be 0 mm. However, the die-cutter distance of 0.01 to 0.2 mm may be allowed.

The rotational frequency of the blades usually ranges from 500 to 2000 rpm, preferably 1000 to 1500 rpm.

The dimensions and shape of individual pellet are controlled by exit diameter of the nozzle, number of blades of the cutter, rotational frequency of the blades and the like.

The water-containing EVOH resin composition extrudate through die, in which EVOH resin is in a molten state, is cut before the EVOH resin solidifies by cooling. This is called hot-cut pelletizing process. The hot-cut pelletizing process is classified into midair hot-cut pelletizing where molten resin is cut in the air, and underwater pelletizing where molten resin is extruded and cut in a chamber filled with cooling liquid and equipped with cutter. Both pelletizing processes may be adopted. The underwater pelletizing process can be carried out with underwater pelletizer.

The cooling liquid is not limited to water. Water/alcohol mixed solution; aromatic hydrocarbons such as benzene; ketones such as acetone and methyl ethyl ketone; ethers such as dipropyl ether; organic esters such as methyl acetate, ethyl acetate, methyl propionate, and the like may be used. Of these, water or water/alcohol mixed solution is commonly used because of handleability. As for the water/alcohol mixed solution, water/alcohol ratio in weight is usually from 90/10 to 99/1. Alcohol such as methanol, ethanol, or propanol can be used for the alcohol, and methanol is preferably used in industries.

The temperature of the cooling liquid in the underwater pelletizing process is such a temperature that molten EVOH resin extrudate does not solidify quickly in the chamber, and is selected from the range of preferably −20 to 50° C., more preferably −5 to 30° C., in the case of the molten EVOH resin coming into contact cooling liquid before being cut.

(2-2) Case of Using Dry EVOH Resin Pellet as a Raw Material

In the case of using dry EVOH resin pellets used as a raw material for EVOH resin pellets, the dry EVOH resin pellets are fed to a kneading extruder and melt-extruded.

Dry EVOH resin pellets used as the raw material has no limitation in their dimensions or shape.

The temperature of EVOH resin in kneading extruder should be set higher than that of water-containing EVOH resin composition, for example, within the range of usually 150 to 300° C., preferably 200 to 285° C., particularly preferably 240 to 270° C. If the set temperature of the extruder is unduly low, EVOH resin pellets might be completely melted. On the other hand, the EVOH resin temperature is elevated to unduly high temperature, the EVOH resin is likely to be heat deteriorated. The temperature of EVOH resin is a temperature measured nearby discharging exit of extruder head with a temperature sensor placed on the extruder cylinder.

The extruder to be used is not particularly limited, but a typical extruder having a nozzle with bore diameter of 1.0 to 5.0 mm, preferably 2.0 to 3.5 mm, from the viewpoint of handleability.

Number of blades of cutter is usually from 2 to 8, preferably from 3 to 6.

A preferable die-cutter distance is 0 mm, which corresponds to use of a die-face cutter whose blades face the discharging exit of the die, but the die-cutter distance about from 0.01 to 0.2 mm may be allowed.

A common rotational frequency of blades is in the range of 1000 to 2000 rpm, preferably 1250 to 1750 rpm.

Pellet shape can be controlled by appropriately adjusting bore diameter of the nozzle, number of blades, rotational frequency of blades, and the like.

By the same token as using water-containing EVOH resin as a raw material, either midair hot-cut pelletizing process or underwater pelletizing process may be employed for the process of pelletizing mol ten resin. The cooling liquid listed for a cooling Liquid usable for water-containing EVOH resin composition as a raw material may be also used for the dry EVOH resin pellets. However, since dry EVOH resin is likely to coagulate comparing to water-containing EVOH resin composition, the temperature of cooling liquid in underwater cut pelletizing process is higher than that in pelletizing process using water-containing EVOH resin as a raw material, and therefore is chosen from the range of usually 0 to 90° C., preferably 20 to 70° C.

Thus produced pellets are preferably subjected to rinsing because common pellets produced from water-containing EVOH resin composition often contain alkaline metal salt which is residue of catalyst used in saponification process. In order to prevent the resulting molded article from lowering qualities such as coloration due to the alkaline metal salt, the pellets are usually rinsed.

Rinsing is conducted in water chamber having a temperature of 10 to 60° C. The rinsing is preferably conducted for 0.5 to 5 hours with use of water of 200 to 1000 parts by weight (preferably 300 to 600 parts by weight) based on 100 parts by weight of EVOH resin pellets at a temperature of 20 to 50° C. (preferably 25 to 35° C). Such rinsing is preferably conducted once through 5 times (preferably once). By such rinsing, the content of alcohol having 5 or less carbon atoms, acetic acid, and sodium acetate can be adjusted and the removal of oligomer or impurities can be attained.

The contents after rinsing may be adjusted as follows: content of alcohol having 5 or less carbon atoms is from 0.0001 to 1 parts by weight, content of acetic acid is from 0.01 to 1 parts by weight, and content of sodium acetate is from 0.01 to 1 parts by weight, all contents being based on 100 parts by weight of EVOH resin pellets.

After rinsing, EVOH resin pellets are optionally allowed to contact aqueous solution containing additives.

A typical additive includes thermal stabilizer, and examples of the thermal stabilizer include organic acids such as acetic acid, propionic acid, butyric acid, lauric acid, stearic acid, oleic acid, and behenic acid or its alkaline metal (e.g. sodium and potassium) salt, alkaline earth metal (e.g. calcium and magnesium) salt, or zinc salt; inorganic acids such as sulfuric acid, sulfurous acid, carbonic acid, phosphoric acid, and boric acid, or alkaline metal (e.g. sodium and potassium) salt, alkaline earth metal (e.g. calcium and magnesium) salt, or zinc salt.

Of these additives, acetic acid, boron compound such as boric acid or salt thereof, acetate and phosphate are particularly preferable.

By bringing EVOH resin pellets into contact with aqueous solution of the additives, the additive is allowed to be contained in the EVOH resin pellets, which may improve the EVOH resin pellets in various physical properties such as thermal stability in melt-molding.

The contacting process is performed for 0.5 to 5 hours with use of 200 to 1000 parts by weight (preferably from 300 to 600 parts by weight) of aqueous solution containing additive of 3% or less (preferably from 0.3 to 1.5%) based on 100 part by weight of EVOH resin pellets. The temperature of the aqueous solution is in the range of 10 to 80° C. (preferably 20 to 60° C., particularly preferably 30 to 40° C.). The contacting process is conducted once to 3 times, preferably once.

By contacting an aqueous solution of additives, contents of the following compounds are preferably adjusted: acetic acid is from 0.001 to 1 part by weight, boric compound is from 0.001 to 1 part by weight as an amount of boron, and acetate or phosphate including hydrogenphosphate is from 0.0005 to 0.1 part by weight as an amount of metal. The amount of boron is determined with ICP atomic emission spectroscopy after incineration of the boric compound. The amount of metal is determined with ICP atomic emission spectroscopy after incineration of acetate and phosphate including hydrogenphosphate.

Water-containing EVOH resin pellets after thus adjustment of the respective contents of ingredients are dried to the water content of usually 1 wt % or less, particularly 0.5 wt % or less.

Any drying method may be adopted for drying the pellets. For example, centrifugal dryer, a perforated conveyor belt that travels across an air knife, ventilation dryer, or fluidized bed dryer, may be used. Multistep drying method with any combination of these may be possible.

A method for manufacturing pellets as thus far described is one for EVOH resin pellets, however, the method may be applied to the method for manufacturing pellets of EVOH resin composition.

In the case of (2-1) using water-containing EVOH resin composition as a raw material for pellets, necessary additives are added while preparing a water-containing EVOH resin composition, and the resulting EVOH resin composition may he used as a raw material for pellets.

In the case of EVOH resin composition containing other thermoplastic resin, the resin composition in molten state which contains molten dry EVOH resin pellets and the molten other thermoplastic resin is used to produce pellets according to the method (2-2).

The pellets thus produced above is pelletized in a manner that melt extrudate is cut into resin pieces before being solidified by cooling, and therefore the obtained resin piece droops at its cutting face and forms into droplet due to its surface tension. Accordingly, thus produced pellets each has no edge and is round over all. Specific shape of the pellet is not only sphere, but also approximate circle or oval in cross section such as approximate spherical, disc, or lenticular in shape, depending on the melt-extrudate shape (typically quadrangular prism or cylinder).

<Packaging container>

A packaging container to be used in the invention is a container for packing pellets of EVOH resin or resin composition thereof. The packing is made in order to keep a group of pellets after shipment and during transportation.

The common packaging container has a size sufficient to store pellets of 20 to 1000 kg. The term "container" used herein is any container capable of storing and packing pellets, and may be a container with cover, packaging bag and so on.

The inside surface of the packaging container used in the invention, which is a face to be contacted with pellets packaged, has a surface resistivity of $1.0 \times 10^{14} \Omega$ or more, preferably $3.0 \times 10^{14} \Omega$ or more, particularly preferably $6.0 \times 10^{14} \Omega$ or more. Adhesion easiness of resin powders to inside surface correlates with surface resistivity of inside surface. The higher the surface resistivity of the inside surface is, the easier the powder adheres to the inside surface. The upper limit of the surface resistivity is preferably set to usually about $1.0 \times 10^{18} \Omega$. If the container has unduly high surface resistivity of inside surface, a lump of pellets is likely to adhere to the inside surface, which causes to make trouble when taking out pellets from the container.

The surface resistivity of inside surface corresponds to a resistance generated when a current flows from one end to the opposite end on the square area with a given size of the sheet. The sheet having high surface resistivity makes the current difficult to flow. This may be understood that the sheet is more electrically charged and is likely to adsorb resin powder.

The "surface resistivity" used herein is measured according to JIS K6911. The measurement is conducted with respect to a sheet having moisture conditioned by being placed for 24 hours in a bath where the constant condition of 23° C. and 50% RH is set. The surface resistivity of the sheet varies with environments, in particular, relative humidity, and therefore is measured after conditioning moisture of the sheet by being placed under their above condition.

An inside surface of a packaging container having relatively high surface resistivity would allow powder to adhere dominantly to the inside surface.

The powder include not only powder occurred by rubbing pellets each other in the container during transportation but also powder adhered to EVOH resin pellets. Of these powders, powder adhered to pellet surface could be removed from the pellet surface upon contacting the inside surface of the container.

As a result, the package container can get rid of powder from the EVOH resin pellets packed in the container.

The surface resistivity of the inside surface of the packaging container depends on a material of the inside surface as well as all materials of the container. In the case that a container is made of multilayer structure, the elements of the multi layer structure such as layer thickness and layer order affect the surface resistivity.

Any packaging container which has inside surface satisfying the surface resistivity mentioned above may be used. A packaging container made of a multilayer structure such as laminated resin films, and metal or paper with resin liner may be used. Examples of the packaging container include plastic box, packaging bag such as paper bag with liner, drum such as fiber drum with liner and plastic drum with liner, box with liner and flexible container.

Synthetic resin which may be used as a component for the multilayer structure includes thermoplastic resins, for instance, polyolefins such as polyethylene and polypropylene; nylon; polyester; polyvinyl chloride, polyvinylidene chloride, acryl-based, and polystyrene.

Metal which may be used as a component for the multilayer structure include, for instance, aluminum, iron, and steel.

Kraft paper such as paper or fabric such as woven- or non-woven fabric may be also used.

A preferable multilayer film is a multilayer film in which metal layer as conductive layer and. resin layer as non-conductive layer are combined. A multilayer film may further comprises an intermediate layer of metal foil or metal deposit, preferably for example, aluminum layer of aluminum foil or aluminum deposit.

A multilayer structure comprising the intermediate layer of metal foil or metal deposit preferable because the intermediate layer can prevent moisture infiltration therethrough.

The film order of the multilayer film, represented by "outer layer// . . . //inner layer", are, for example, kraft paper//polyethylene, polyethylene//aluminum//polyethylene, polyester//aluminum//nylon//polyethylene, nylon//aluminum//polyethylene, nylon//polyethylene//aluminum//polyethylene//polyethyl ene, kraft paper//polyethylene//aluminum//polyethylene, aluminum deposit//nylon//polyethylene, clear polyester deposit//nylon//polyethylene, and so on.

In the case that outer layer is made of plastic film, the outer layer may be covered with one or two layers of kraft paper.

Outer layer of the multilayer film may be coated for non-slipping.

The thickness of the multilayer film is in the range of usually 50 to 500 μm, preferably 70 to 300 μm.

In the above-mentioned multilayer film, the thickness of aluminum layer or aluminum foil is in the range of 5 to 50 μm, preferably 7 to 20 μm.

The thickness of polyethylene layer is in the range of usually 30 to 300 μm, preferably 50 to 200 μm. The thickness of nylon layer is in the range of usually 10 to 100 μm, preferably 15 to 25 μm.

Such multilayer film is sealed along its rim to form a packaging bag, which is preferable packaging container. For this use, polyethylene, which has a relatively low melting point among synthesis resins, may be preferably used for an inner layer of the multilayer film.

In general, the synthetic resin layer in a multilayer film is likely to be charged with electrons. In the case of inside surface having unduly high surface resistivity, not only powder but also pellets is likely to adhere to it. Interposing a metal layer such as aluminum foil in the multilayer structure comprising synthetic layers can suppress excessive elevation of the surface resistivity. The occupation ratio of aluminum layer to the total thickness of the multilayer film is preferably chosen from the range of 3 to 10%.

[Package]

A package of the invention is a package for pellets of EVOH resin or resin composition thereof. Each of the pellets has approximate circular or oval cross-section and the pellets are stored in a packaging container (or packaging bag) described above.

A unit amount of the pellets stored in one packaging container is selected in the range of about 20 to about 1,000 kg, depending on dimension and type of the packaging container. For example, in the case of using packaging bag as a packaging container, the unit amount is 20 to 30 kg. In the case of metallic drum the unit amount is from 80 to 120 kg, in the case of box the unit amount is from 500 to 750 kg, and in the case of flexible container the unit amount is from 500 to 1000 kg.

A packaging bag can be sealed by heat sealing the opening of the bag.

In the case of metallic container such as metallic drum, pellets may be stored in the container closed with use of a separate member such as a cover.

The package for pellets of EVOH resin or resin composition thereof contains powder, which is generated from pellets due to rubbing of pellets each other in manufacturing process or during transportation.

The term "powder" used herein means powder having sizes such that powder is easily generated from pellets due to their rubbing or collision while production or transportation of the pellets. The powder include powder generated before storing pellets of EVOH resin or resin composition thereof in a packaging container, powder generated in the production of the packaged article, powder generated after production of the packaged article, and powder generated during transportation of the packaged article. In the case that powder already has existed in a packaging container before pellets of EVOH resin or resin composition thereof are put in the packaging container, the powder is also included.

Accordingly, the powder has a composition substantially similar to that of the pellets in the package.

However, the powder targeted in the invention can be definitely discriminated based on its shape, size or the like.

The shape of the target powder is not limited. The shape of the fine particle of the powder depends on reasons for generating the powder such as condition of the package, condition of transportation, and so on. For example, powder may include lump of particles caused by breakage of pellets or partially dropping to pieces from pellets, plate-like particles seemingly pressed with machine, fibrous clump of powder which fibrous or plate-like particles gather, fibrous particles, cotton-like clump of fibrous particles, and the like.

The powder targeted in the invention has a common size capable of passing through a 30 mesh sieve (aperture 500 μm). If the powder having such size is fed together with pellets to a molding apparatus as a molding material, gel is likely to occur, which causes to jumble the surface boundary of the resulting EVOH resin layer.

The amount of powder in the package of the invention is in the range of usually 0.0001 wt % or more but 2.0 wt % or less, preferably 1.0 wt % or less, more preferably 0.5 wt % or less, particularly preferably 0.2 wt % or less, based on the weight of pellets of EVOH resin or resin composition thereof contained in the package. The amount depends on not only the amount of powder adhered to individual pellet when the pellets are packed or shipped, but also the condition of the pellets in the package, the condition of transportation of the package, and so on.

Even if the powder amount increases comparing with powder amount contained in the package which is shipped from the production place, the powder rather than the pellets is likely to adhere to inside surface of the packaging container in the case of using the packaging container having $1.0 \times 10^{14} \Omega$ or more of surface resistivity. In the other words, in the case of the package using a container having above-mentioned range of surface resistivity, the powder in the package is likely to adhere to inside surface of the container rather than the surface of the pellets. Accordingly, even if a package contains powder in the above-mentioned amount, the amount of powder adhered to the pellets taken out of the package can become smaller.

In a specific case of using a packaging container having inside surface of $1.0 \times 10^{14} \Omega$ or more in surface resistivity, 50 wt % or more, preferably 60 wt % or more, more preferably 80 wt % or more of powder adhered to the surfaces of pellets can be removed. As a result, the amount of powder can reduce to 0.8 wt % or less, preferably 0.4 wt % or less, more preferably 0.3 wt % or less, furthermore preferably 0.2 wt % or less, based on the weight of pellets.

The package for pellets of EVOH resin or resin composition thereof is served to users in the form mentioned above.

The users may take out the pellets of EVOH resin or resin composition thereof from the package in any manner. The user may open the package container and subsequently feed the pellets directly from the opened container to feeder of a molding apparatus. Pellets are preferentially released from the package and powder still remains adhered to the inside surface of the packaging container. Thus pellets contaminated with less powder can be served as a molding material.

This remarkable effect can be obtained with pellet having approximate circular or oval cross-section, namely, round pellet without edge, such as spherical, lenticular or disc-shaped pellet. The reason is not clear, round pellet without edge such as spherical, lenticular or disc-shaped pellet has so smooth surface that powder is difficult to durably remain on the surface of the pellet. It is supposed that powder would durably stay on inside surface of the packaging container rather than the surface of the pellet. In the case of cylindrical EVOH resin pellet, the face appeared by cutting pellet is less smooth, while the original outer surface of the pellet is smooth. Therefore, it is supposed that powder is difficult to durably remain on the smooth surface which is lateral face of the cylindrical pellet while powder is likely to adhere to a less smooth face which appears by cutting. Retaining powder on the pellet stably makes less powder adhered to the inside surface of the packaging container. In conclusion, powder generated in a packaging container is difficult to adhere to spherical, lenticular or disc-shaped pellet without edge, and even the powder adhered to the pellet once transfers easily to inside surface of the container. Accordingly, in the case of the package for pellets each of which has a spherical, lenticular or disc shaped without edge, the package could provide pellets with less powder when being taken out from the package.

A user can feed the pellets taken out from the package into a molding apparatus. If necessary, other thermoplastic resin or some additives may be mixed with the pellets and thereafter the resultant mixture may be supplied to a molding apparatus.

<Applicability of Pellets of EVOH Resin or Resin Composition Thereof>

According to the invention, pellets of EVOH resin or resin composition thereof after being taken out from the package, that is to say, the pellets to be supplied as a molding material retain powder contaminating the pellets in the content of 0.8% or less, preferably 0.4% or less, more preferably 0.3% or less, further preferably 0.2% or less, by weight based on pellets, Pellets can exhibit superior gas-barrier property based on EVOH resin, therefore, the pellets may be melt molded into film, sheet or container such as bottle, which is utilized for wrapping material for food, pharmaceutical preparations, industrial medicine, pesticide, and so on.

In general, extrusion molding (e.g. T-die extrusion, tubular film extrusion, blow molding, melt spinning, and contour extrusion), or injection molding is employed for melt-molding method using the pellets. The melt-molding temperature is often chosen from the range of 150 to 300° C.

Pellets of EVOH resin or resin composition thereof is also utilized for laminate, in particular, laminate wherein a thermoplastic layer is laminated on at least one face of the layer of EVOH resin.

Another substrate is laminated on one or both faces) of the EVOH resin layer to form the laminate. Examples of the method of laminating include a method of melt-extruding a thermoplastic resin on a film or sheet of EVOH resin; a method of melt-extruding EVOH resin on a substrate of thermoplastic resin; a method of coextruding EVOH resin and other thermoplastic resin; and a method of dry laminating film or sheet of EVOH resin and another film or sheet as a substrate using a known adhesive such as organic titanium compound, isocyanate compound, polyester-based compound, or polyurethane compound.

The other resin used for coextrusion include, for example, olefin homo- or copolymers such as linear low density polyethylene, low density polyethylene, medium density polyethylene, high density polyethylene, ethylene-vinyl acetate copolymer, ionomer, ethylene-propylene copolymer, ethylene-acrylic acid ester copolymer, polypropylene, propylene-α-olefin (α-olefin having from 4 to 20 carbon atoms) copolymer, polybutene, and polypentene; graft modified olefins obtained by modifying the olefin homo- or copolymer with unsaturated carboxylic acid or its ester, and the like polyolefin-based resin in a broad sense; polyester, polyimide, copolyamide, polyvinyl chloride, polyvinylidene chloride, acryl-based resin, polystyrene, vinyl ester-based resin, polyester elastomer, polyurethane elastomer, chlorinated polyethylene, chlorinated polypropylene, and so on. Another EVOH resin may be used for the coextrusion. Of these, polypropylene, potyami de, polyethylene, ethylene-vinyl acetate copolymer, polystyrene, or PET is preferably used from the point of easy film formation by coextrusion, physical properties (particularly strength) of the resulting film and other practicality.

Thus laminated product may be utilized directly for various shaped articles. Preferably, the laminated product may be subjected to stretching treatment in order to improve physical properties of the laminated product. Either uniaxial stretching or biaxial stretching may be employed for the stretching treatment. Stretching at high magnification is preferable because of enhancement of physical properties, thereby suppressing the occurrence of pinhole, crack, stretching nonuniformity, or delamination during stretching to provide superior stretch(ed) film or sheet free from these defects.

The laminate thus produced may be in any form including film, sheet, tape, bottle, pipe, filament, or contour extrudate. The laminate may be subjected to heat treatment, cooling treatment, rolling treatment, printing, dry laminating treatment, coating with a solution or melt, bag-making, deep drawing processing, box-processing, tube processing, split processing, and so on. Thus produced film, sheet or container is useful for a wrapping material for a variety of goods such as food, pharmaceutical preparations, industrial medicine, and agricultural chemicals.

EXAMPLE

Hereinafter the present invention is described below based on examples, but the invention is not restricted by the examples unless exceeding the gist of the invention.

Incidentally, the unit "part" in the examples is on the basis of weight.

[Methods for measurement and evaluation]

(1) Surface Resistivity ($\Omega$)

Moisture conditioning of a test film for a packaging bag was performed by leaving to stand. for 24 hours in a chamber which is set at a temperature of 23° C. and relative humidity of 50% RH. The test film after moisture conditioning was measured using surface resistivity meter R8340A (Advantest Corporation) according to JIS K6911 with respect to the surface resistivity of the surface layer of the test film which corresponds to the inside surface of the packaging bag.

(2) Removal Rate of Powder (%)

A removal rate of powder (%) was determined by calculating a rate of the amount (P) of powder staying on the inside surface of packaging bag to the amount (A) of all powders in the package according to the formula below.

The amount (P) of powder staying on the inside surface of packaging bag was determined by calculating with the weight of the packaging bag before the EVOH resin pellets were put therein and the weight of packaging bag after the pellets were taken out therefrom.

Weight of powder staying on inside surface of packaging bag (P)=(weight of packaging bag after pellets are taken out therefrom)−(weight of packaging bag before pellets are put therein)

Removal rate=P/A×100

(3) Volatile Matter Content of Pellet (%)

Volatile matter content of pellet (%) was determined by calculating with the weight of EVOH resin pellets before drying and the weight of the pellets after drying for 5 hours at 150° C.

Volatile matter content of pellet (%)=(weight of EVOH resin pellet before drying−weight of the EVOH resin pellet after drying)/the weight of EVOH resin pellet before di ping×100

[Pellets]
(1) Cylindrical-Like Shaped EVOH Resin Pellet

The cylindrical-like shaped pellet was produced in strand-cut pelletizing with use of EVOH resin having ethylene content 38 mol %, saponification degree 99.6 mol %, and MFR.,3.9 g/10 min. (210° C., load of 2160 g). EVOH resin solution, in which the EVOH resin is dissolved in mixed solvent of water and methanol (water/methanol=40/60 (weight ratio)) in the content of 45%, was extruded like a strand into a coagulating bath (water/methanol=95/5 (weight ratio)) which is maintained at 5° C., thereby obtaining a strand. The strand was cut with cutter to produce EVOH resin pellets each having a cylindrical-like shape shown in FIG. 2.

The produced EVOH resin pellets were dried by leaving to stand for 16 hours in oven set at 120 ° C., and then powders were removed from the pellets. Thus obtained dry pellets had a volatile matter content of 0.25%, which contained almost no moisture.

The dry pellet of EVOH resin has a cylindrical-like shape having 2.5 mm in diameter of upper and lower surfaces and 2.6 mm in height, and has almost no powder staying on its surface.

(2) Approximate Spherical EVOH Resin Pellet

The cylindrical-like shaped pellets of EVOH resin (ethylene content 38 mol %, saponification degree 99.6 mol %, and MFR3.9 g/10 min. (210° C., load of 2160 g)), which were obtained above, were melt-kneaded with twin screw extruder to extrude the EVOI-I resin melt through die into cooling water. The extrudate of the EVOH resin melt was cut in water to obtain EVOH resin pellets. This pelletizing process is underwater cut pelletizing, thereby producing EVOH resin pellets each of which has a shape of approximate sphere as shown in FIG. 1. The profile of this process is described below.

(Profile of Melt-Kneading)
  inner diameter of screw: 70 mm
  L/D :39
  screw rotational frequency: 300 rpm
  die temperature: 260° C.
  temperature of cylinder (highest temperature zone): 260° C.
  caliber of the nozzle: 3.2 mmϕ
  discharge amount: 350 kg/h
  rotational frequency of cutter blade: 1500 rpm
  temperature of cooling water: 60° C.

Thus obtained EVOH resin pellets were subjected to the treatment for removal of powder. The resulting pellets had volatile matter content of 0.28%, corresponding to almost free from moisture.

Each of the resulting pellets has a shape of approximate sphere with major diameter of 4.6 mm and minor diameter of 3.5 mm. Powder on the pellets was rarely observed.

(3) Powder of EVOH Resin

The above produced EVOH resin pellets each of which had cylindrical-like shape were frozen and then crushed to obtain powder passing through 30 mesh sieve (aperture: 500 µm) and having volatile flatter content of 0.25%. The powder was used as powder of EVOH resin.

<Relation Between Surface Resistivity of Packaging Bag and Removal Rate of Powder>

Package Nos. 1 to 7

The multilayer film having layer order and surface resistivity as shown in Table 1 was cut into film specimen with 21 cm long and 12 cm wide. The film specimen was folded in half in the manner that low density polyethylene layer was inside and thereafter two side margins of the resultant were sealed to form a packaging bag.

The previously prepared group of pellets (either group of approximate spherical pellet or group of cylindrical-like shaped pellet) 50 g and EVOH resin powder 0.15 g (corresponding to 0.3 wt % based on the pellets) were put in the packaging bag as shown in Table 1 and closed the opening of the bag by heat sealing, resulting in forming a pouch.

The pouch was shaken in a manner that the contents were mixed homogeneously.

Next, the package was opened by cutting a heat sealed side margin. After all EVOH resin pellets were taken out, the package was cut at the remaining two heat sealed margins and was spread into film. The EVOH resin powder adhered to the surface of the film corresponding to inside surface of the package bag was weighed and the removal rate of powder was calculated according to previously described method.

The obtained results are shown in Table 1.

TABLE 1

| | | Package No | | | | | | |
|---|---|---|---|---|---|---|---|---|
| | | 1 | 2 | 3 | 4 | 5 | 6 | 7 |
| Package | Layer order of packaging bag (thickness: µm) | PET(12)/ Al(9)/ Ny(15)/ PE(70) | KP(50)/ PE(10)/ Al(7)/ PE(70) | KP(50)/ PE(15)/ Al(9)/ PE(70) | PET(12)/ Al(9)/ Ny(25)/ PE(70) | PET(12)/ Al(9)/ Ny(15)/ PE(70) | KP(70)/ PE(15)/ Al(9)/ PE(70) | PET(12)/ Al(9)/ Ny(25)/ PE(70) |
| | Occupation rate of Al layer(%) | 8.5 | 5.1 | 6.3 | 7.8 | 8.5 | 5.5 | 7.8 |
| | Surface resistivity Ω | $8.1 \times 10^{14}$ | $1.1 \times 10^{15}$ | $2.7 \times 10^{15}$ | $9.2 \times 10^{13}$ | $8.1 \times 10^{14}$ | $2.7 \times 10^{15}$ | $9.2 \times 10^{15}$ |
| | Shape of pellet | Approximate sphere | Approximate sphere | Approximate sphere | Approximate sphere | Cylindrical-like | Cylindrical-like | Cylindrical-like |
| Removal rate of powder (%) | | 62 | 80 | 81 | 20 | 2 | 24 | 13 |

PET: polyethylene terephthalate
Al: aluminum
Ny: nylon
PE: polyethylene
KP: kraft paper It is understood from Nos. 1 to 4 of Table 1 that in the case of package for approximate spherical EVOH resin pellets, the inside surface of the packaging bag having higher surface resistivity could attain the higher removal rate of powder, On the other hand, in the case of package for cylindrical-like shaped pellets, Nos. 5 to 7, there was poor correlation between surface resistivity of inside surface of the packaging bag and removal rate of powder. The cylindrical-like shaped pellets retained powder on their surface even after being taken from the package. This is supposed that since the cylindrical-like shaped pellet has relatively large surface area which powder can adhere to or stably stay at, the powder once attached to the surface would not fall off.

<Relation Between Amount of EVOH Resin Pellets put in and Removal Rate of Powder>

Package No. 10:

Package No. 10 was made in the same manner as package No. 1 except that EVOH resin powder was changed in a different amount shown in Table 2. After the pellets were taken out from the produced package, the powder remaining in the package was weighed to calculate removal rate of powder according to the previously described method.

The obtained result together with that of No. 1 are shown in Table 2.

Package No. 11:

Package No. 11 was made in the same manner as package No. 5 except that EVOH resin powder was changed in a different amount shown in Table 2. After the pellets were taken out from the produced package, the powder remaining in the package was weighed to calculate removal rate of powder according to the previously described method.

The obtained result together with that of No. 5 are shown in Table 2.

TABLE 2

|  | Package No | 1 | 10 | 5 | 11 |
|---|---|---|---|---|---|
| Package | Layer order of packaging bag (thickness: μm) | PET(12)/ Al(9)/Ny(15)/ PE(70) | PET(12)/ Al(9)/Ny(15)/ PE(70) | PET(12)/ Al(9)/Ny(15)/ PE(70) | PET(12)/ Al(9)/Ny(15)/ PE(70) |
|  | Surface resistivity Ω | $8.1 \times 10^{14}$ | $8.1 \times 10^{14}$ | $8.1 \times 10^{14}$ | $8.1 \times 10^{14}$ |
|  | Shape of pellet | Approximate sphere | Approximate sphere | Cylindrical-like | Cylindrical-like |
|  | Amount of powder (weight %) | 0.3 | 0.1 | 0.3 | 0.1 |
| Removal rate of powder (%) |  | 62 | 68 | 2 | 2 |

It is understood from the results of Nos. 5 and 11 that in the case of the package for cylindrical-like shaped pellets, the removal rate of powder was not affected by the amount of powder put in the packaging bag.

It is also understood from the results of Nos. 1 and 10 that the less amount of powder put the packaging bag exhibited higher removal rate regardless of the same surface resistivity of the packaging bag, It is supposed that the electrically charged condition of the inside surface of the packaging bag was neutralized by adherence of powder, Therefore, the less amount of the powder to be removed, the more easily the powder would adhere to and stay at the inner surface of the bag. However, this phenomenon was realized in the group of approximate spherical pellets but not realized in the group of cylindrical-like shaped pellets. The reason is not clear but the group having highly relation between the amount of powder attached and surface resistivity of the packaging bag, such as the group of approximate spherical pellets, was likely to obtain the effect of the packaging bag. The effect is removal of powder by attracting the powder to the bag due to its electrical charge.

Moreover, individual pellet of the EVOH resin pellets produced by hot-cut pelletizing (underwater cut pelletizing or midair hot-cut pelletizing) is approximate sphere in shape and has highly smooth surface. This would have trouble for the powder to stay stably on the surface of the pellet, Furthermore, once powder adheres to the surface of the pellets, the powder would be likely to transfer to the inside surface of the packaging bag upon contacting with the inside surface because of easily adhering thereto.

Accordingly, as for the package for approximately spherical pellets, which powder is less likely to adhere to than cylindrical-like shaped pellets, even if the powder occurs due to pellets rubbing during transportation, the powder can be suppressed to adhere to the pellets. Additionally, the packaging bag having relatively high surface resistivity encourages powder once adhered to the surface of pellets to transfer to the inside surface thereof. As a result, the packaging bag can inhibit powder leaving from the bag together with pellets taken from the bag. In conclusion, the package for pellets each having approximate circular or oval cross-section can provide pel lets almost without contamination of powder to users. This can provide a molding material capable of readily producing a molded article having excellent properties based on inherent properties of EVOH resin or resin composition thereof.

INDUSTRIAL APPLICABILITY

The package of the present invention can provide users with pellets substantially free from powder which generated after shipment and during transportation only by using a packaging container having a specific range of surface resistivity. This is costless method for a pellets manufacturer who aims to provide pellets free from powder, while a user can achieve to produce a molded article with high quality based on the pellets substantially free from powder. Accordingly, the present invention is useful both for the manufacture and users.

The invention claimed is:

1. A package comprising pellets made of saponified ethylene-vinyl ester-based copolymer or resin composition thereof, and a packaging container in which the pellets are packed, wherein the inside surface of the packaging container has a surface resistivity of $1.0 \times 10^{14} \Omega$ or more, the surface resistivity being measured according to JIS K6911 with respect to the inside surface of the packaging container after moisture conditioned by being placed for 24 hours in a bath where the constant condition of 23° C. and 50% RH being set, and wherein each of the pellets has no edge and an approximately circular or oval cross-section.

2. The package according to claim 1, wherein the inside surface of the packaging container has a surface resistivity of $1.0\times10^{18}\Omega$ or less.

3. The package according to claim 1, wherein the packaging container is formed from a multilayer film.

4. The package according to claim 3, wherein the multilayer film comprises an aluminum layer.

5. The package according to claim 4, wherein a rate in thickness of the aluminum layer to the multilayer film is in the range of 3.0 to 10%.

6. The package according to claim 1, further comprising powder in an amount of 0.0001 to 2.0 weight % based on the weight of the pellets of saponified ethylene-vinyl ester-based copolymer or resin composition thereof.

7. The package according to claim 6, wherein the powder has a dimension passing through a 30 mesh sieve having an aperture of 500μm.

8. Pellets of saponified ethylene-vinyl ester-based copolymer or resin composition thereof, the pellets having been packed in the package of claim 1, the pellets taken out from the package characterized by that the amount of powder attached to surface of the pellets is 0.8 weight % or less based on the weight of the pellets.

9. A method for reducing powder adhered to the surface of pellets made of saponified ethylene-vinyl ester-based copolymer or resin composition thereof, the pellets each having an approximately circular or oval cross-section and no edge, and the pellets obtained from a package therefor, characterized by that a packaging container for packing the pellets has an inside surface of surface resistivity of $1.0\times10^{10}\Omega$ or more, the surface resistivity being measured according to JIS K6911with respect to the inside surface of the packaging container after moisture conditioned by being placed for 24 hours in a bath where the constant condition of 23 ° C. and 50% RH being set.

10. The method according to claim 9, wherein the packaging container is formed from a multilayer film comprising an aluminum layer.

* * * * *